United States Patent
Hikmet et al.

(10) Patent No.: US 12,538,394 B2
(45) Date of Patent: Jan. 27, 2026

(54) HIGH INTENSITY BBL DIMMABLE LIGHT SOURCE

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/724,222

(22) PCT Filed: Dec. 15, 2022

(86) PCT No.: PCT/EP2022/086227
§ 371 (c)(1),
(2) Date: Jun. 26, 2024

(87) PCT Pub. No.: WO2023/126202
PCT Pub. Date: Jul. 6, 2023

(65) Prior Publication Data
US 2025/0071868 A1    Feb. 27, 2025

(30) Foreign Application Priority Data
Dec. 27, 2021   (EP) .................................... 21217807

(51) Int. Cl.
H05B 33/20     (2006.01)
H05B 45/10     (2020.01)
H05B 45/20     (2020.01)

(52) U.S. Cl.
CPC ............. *H05B 33/20* (2013.01); *H05B 45/10* (2020.01); *H05B 45/20* (2020.01)

(58) Field of Classification Search
CPC ......... H05B 33/20; H05B 45/20; H05B 45/10
(Continued)

(56) References Cited

U.S. PATENT DOCUMENTS

2017/0111972 A1   4/2017   Oepts et al.
2018/0056027 A1   3/2018   Peeters et al.
(Continued)

FOREIGN PATENT DOCUMENTS

WO   2021032721 A1   2/2021
WO   2021063878 A1   4/2021
(Continued)

*Primary Examiner* — James R Greece
*Assistant Examiner* — Hana S Featherly

(57) ABSTRACT

The invention provides a light generating system (1000) comprising a first light generating device (110), a second light generating device (120), a third light generating device (130), a luminescent material (200), and a control system (300), wherein: (A) the first light generating device (110) comprises a first laser light source and is configured to generate first device light (111) having a first device peak wavelength ($\lambda_1$) and having a first spectral power distribution; wherein the first device peak wavelength ($\lambda_1$) is selected from the wavelength range of 445-475 nm; (B) the second light generating device (120) comprises a second laser light source and is configured to generate second device light (121) having a second device peak wavelength ($\lambda_2$) and having a second spectral power distribution, different from the first spectral power distribution; wherein the second device peak wavelength ($\lambda_2$) is selected from the range of 420-450 nm or from the range of 470-490 nm; (C) the luminescent material (200) is excitable by the first device light (111) and the second device light (121); wherein the luminescent material (200) is configured to convert at least part of one or more of the first device light (111) and/or the second device light (121) into luminescent material light (201) having a centroid wavelength $\lambda_{c,1}$ within the green-orange wavelength range; the luminescent material (200) has an absorbance band having a first absorbance E1 at the first device peak wavelength ($\lambda_1$) and a second absorbance E2 at the second device peak wavelength ($\lambda_2$), wherein
(Continued)

E2/E1<1; (D) the third light generating device (110) comprises a third laser light source and is configured to generate third device light (111) having a third device peak wavelength (23) selected from the wavelength range of 600-650 nm; (E) $|\lambda_1-\lambda_2|\geq 20$ nm; $\lambda_1$ and $\lambda_2$ are selected from the wavelength range of 420-490 nm; and $|\lambda c_1-\lambda_3|\geq 20$ nm; (F) the control system (300) is configured to control at least the first light generating device (110) and the second light generating device (120): (G) the light generating system (1000) is configured to provide in an operational mode white system light (1001).

15 Claims, 9 Drawing Sheets

(58) Field of Classification Search
USPC .......................................................... 313/503
See application file for complete search history.

(56) References Cited

U.S. PATENT DOCUMENTS

| | | |
|---|---|---|
| 2018/0316160 A1 | 11/2018 | Raring et al. |
| 2019/0037185 A1 | 1/2019 | Tarpan et al. |
| 2019/0185743 A1* | 6/2019 | Kim ........................ H05B 33/22 |
| 2020/0155081 A1* | 5/2020 | Seo ......................... A61B 5/443 |
| 2020/0254274 A1* | 8/2020 | Löwgren .............. A61N 5/0625 |

FOREIGN PATENT DOCUMENTS

| | | |
|---|---|---|
| WO | 2021069562 A1 | 4/2021 |
| WO | 2021083730 A1 | 5/2021 |
| WO | 2021032721 A8 | 3/2022 |

* cited by examiner

HIGH INTENSITY BBL DIMMABLE LIGHT SOURCE

CROSS-REFERENCE TO PRIOR APPLICATIONS

This application is the U.S. National Phase application under 35 U.S.C. § 371 of International Application Ser. No. 21/217,807.3, filed on Dec. 15, 2022, which claims the benefit of European Patent application Ser. No. 21/217,807.3, filed on Dec. 27, 2021. These applications are hereby incorporated by reference herein.

FIELD OF THE INVENTION

The invention relates to a light generating system and to a lighting device comprising such light generating system.

BACKGROUND OF THE INVENTION

Light sources, such as laser light sources, are known in the art. US20180316160, for instance, describes an integrated white light source comprising: a laser diode device comprising a gallium and nitrogen containing material and configured as an excitation source; a phosphor member configured as a wavelength converter and an emitter and coupled to the laser diode device; a common support member configured to support the laser diode device and the phosphor member, a heat sink thermally coupled to the common support member, the common support member configured to transport thermal energy from the laser diode device and phosphor member to the heat sink; an output facet configured on the laser diode device to output a laser beam comprised of electromagnetic radiation selected from a violet and/or a blue emission with a first wavelength ranging from 400 nm to 485 nm; a free space, between the output facet and the phosphor member with a non-guided characteristic capable of transmitting the laser beam from the laser diode device to an excitation surface of the phosphor member; a range of angles of incidence between the laser beam and the excitation surface of the phosphor member so that on average the laser beam has an off-normal incidence to the excitation surface and a beam spot is configured for a certain geometrical size and shape; wherein the phosphor member converts a fraction of the electromagnetic radiation from the laser beam with the first wavelength to an emitted electromagnetic radiation with a second wavelength that is longer than the first wavelength; a plurality of scattering centers associated with the phosphor member to scatter electromagnetic radiation with the first wavelength from the laser beam incident on the phosphor member; a reflective mode characterizing the phosphor member such that the laser beam is incident on a beam spot area on the excitation surface of the phosphor member and a white light emission is outputted substantially from the same beam spot area, the white light emission being comprised of a mixture of wavelengths characterized by at least the second wavelength emitted electromagnetic radiation from the phosphor member; and a form factor characterizing a package of the integrated white light source, the form factor having a length, a width, and a height dimension.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources is the heat management of the ceramic phosphor. Other problems associated with such laser light sources may be the desire to create compact high power devices, which may not always be relatively easy. Further, when using luminescent materials, high intensity pump light sources may lead to thermal quenching of some known luminescent materials. However, when using e.g. laser diodes, not all types of laser diodes are efficient.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system ("system") comprising a first light generating device, a second light generating device, and a luminescent material. In embodiments, the light generating system may further comprise a third light generating device. Especially, the first light generating device may in embodiments comprise a semiconductor-based light source, such as a laser light source (such as e.g. a laser diode). Especially, the first light generating device may be configured to generate first device light having a first device peak wavelength ($\lambda_1$). The first device light may have a first spectral power distribution. In embodiments, the first device peak wavelength ($\lambda_1$) may be selected from the wavelength range of 445-475 nm. Further, the second light generating device may in embodiments comprise a semiconductor-based light source, such as a laser light source (such as e.g. a laser diode).

Especially, the second light generating device may be configured to generate second device light having a second device peak wavelength ($\lambda_2$). The second device light may have a second spectral power distribution. In embodiments, the second device peak wavelength ($\lambda_2$) may be selected from the range of 420-450 nm or from the range of 470-490 nm. The first spectral power distribution and the second spectral power distribution may be different. Yet, in embodiments the luminescent material may be excitable by the first device light and the second device light. Especially, the luminescent material may be configured to convert at least part of one or more of the first device light and/or the second device light into luminescent material light. In embodiments, the luminescent material light may have a centroid wavelength $\lambda_{c,1}$ within the green-orange wavelength range. The luminescent material may have an absorbance band having a first absorbance E1 at the first device peak wavelength ($\lambda$) and a second absorbance E2 at the second device peak wavelength ($\lambda_2$). Especially, in embodiments E2/E1<1. In specific embodiments, $|\lambda_1-\lambda_2|\geq 20$ nm. Further, in embodiments 21 and 22 may be selected from the wavelength range of 420-490 nm. The system may further comprise a control system. Especially, the control system may be configured to control at least the first light generating device and the second light generating device. As indicated above, the system may further comprise in embodiments third light generating device. Especially, the third light generating device may in embodiments (also) comprises a semiconductor-based light source, such as a laser light source (such as e.g. a laser diode). Especially, the third light generating device may be configured to generate third device light having a third device peak wavelength ($\lambda_3$). The third device light may have a third spectral power distribution. In embodiments, the third device peak wavelength ($\lambda_3$) may be selected from the wavelength range of 590-780 nm, more especially 600-650 nm. Especially, the first spectral power distribution, the second spectral power distribution, and the third spectral power distribution mutually differ. Especially, $|\lambda_{c,1}-\lambda_3|\geq 20$ nm may apply, more especially $|\lambda_{c,1}-\lambda_3|\geq 30$. Further, in embodiments the light generating system may be configured to provide in an operational mode white system light. Hence, in specific embodiments the invention provides a light generating system comprising a first light generating device, a second light generating device, a third light generating device, a luminescent material, and a control system, wherein: (A) the first light generating device comprises a laser light source and is configured to generate first device light having a first device peak wavelength ($\lambda_1$) and having a first spectral power distribution; wherein the first device peak wavelength ($\lambda_1$) is selected from the wavelength range of 445-475 nm; (B) the second light generating device comprises a laser light source and is configured to generate second device light having a second device peak wavelength ($\lambda_2$) and having a second spectral power distribution, different from the first spectral power distribution; wherein the second device peak wavelength ($\lambda_2$) is selected from the range of 420-450 nm or from the range of 470-490 nm; (C) the luminescent material is excitable by the first device light and the second device light; wherein the luminescent material is configured to convert at least part of one or more of the first device light and/or the second device light into luminescent material light having a centroid wavelength $\lambda_{c,1}$ within the green-orange wavelength range; the luminescent material has an absorbance band having a first absorbance E1 at the first device peak wavelength ($\lambda$) and a second absorbance E2 at the second device peak wavelength ($\lambda_2$), wherein E2/E1<1; (D) the third light generating device comprises a laser light source and is configured to generate third device light having a third device peak wavelength ($\lambda_3$) selected from the wavelength range of 600-650 nm; (E) $|\lambda_1-\lambda_2|\geq 20$ nm; $\lambda_1$ and $\lambda_2$ are selected from the wavelength range of 420-490 nm; and $|\lambda_{c,1}-\lambda_3|\geq 30$ nm; and (F) the control system is configured to control at least the first light generating device and the second light generating device, and wherein the light generating system is configured to provide in an operational mode white system light.

With such system, a high intensity light generating system may be provided. Further, such system may be relatively simple. Further, with such system it is possible to control the correlated color temperature over at least 500 K, or even over about 1000 K, while provide white light having a color point relatively close to the black body locus.

As indicated above, the system may comprise a first light generating device, a second light generating device and optionally a third light generating device.

The first light generating device ("first device") may especially be configured to generate first device light. Especially, the first light generating device comprises a first light source. The first light source may especially be configured to generate first light source light. In embodiments, the first device light may essentially consist of the first device light. In specific embodiments, the first light source may comprise a laser light source. Hence, in specific embodiments the first light source light may comprise first laser device light. Therefore, in specific embodiments the first device light may essentially consist of first laser device light. Hence, as also indicated below, in embodiment the light generating system may comprise a first laser device. The term "first laser device" may also refer to a plurality of essentially the same type of first laser devices, like from the same bin.

The second light generating device ("second device") may especially be configured to generate second device light. Especially, the second light generating device comprises a second light source. The second light source may especially be configured to generate second light source light. In embodiments, the second device light may essentially consist of the second device light. In specific embodiments, the second light source may comprise a laser light source. Hence, in specific embodiments the second light source light may comprise second laser device light. Therefore, in specific embodiments the second device light may essentially consist of second laser device light. Hence, as also indicated below, in embodiment the light generating system may comprise a second laser device. The term "second laser device" may also refer to a plurality of essentially the same type of second laser devices, like from the same bin.

The third light generating device ("third device") may especially be configured to generate third device light. Especially, the third light generating device comprises a third light source. The third light source may especially be configured to generate third light source light. In embodiments, the third device light may essentially consist of the third device light. In specific embodiments, the third light source may comprise a laser light source. Hence, in specific embodiments the third light source light may comprise third laser device light. Therefore, in specific embodiments the third device light may essentially consist of third laser device light. Hence, as also indicated below, in embodiment the light generating system may comprise a third laser device. The term "third laser device" may also refer to a plurality of essentially the same type of third laser devices, like from the same bin.

Hence, the phrase "the system may comprise a first light generating device, a second light generating device, and a third light generating device", and similar phrases, may especially refer to embodiments wherein the system may comprise a first laser light source, a second laser light source, and a third laser light source.

Further, the phrase "the system may comprise a first light generating device, a second light generating device, and a third light generating device", and similar phrases, may also refer to embodiments wherein the system may comprise one or more first light generating devices, one or more second light generating devices, and one or more third light generating devices.

Here below, some aspects in relation to light sources and laser light sources etc. are provided, which may apply to one or more of the first light generating device, the second light generating device, and the (optional) third light generating device.

A light generating device may comprise one or more light sources, more especially one or more solid state light sources. Further, the light generating device may comprise optics. Light, i.e. light source light (from the one or more light sources), escaping from the one or more light sources may in embodiments be beam shaped via the optics. Device light may especially comprise the light source light. More especially, the device light may essentially consist of the (light source) light of the one or more light sources.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc., The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs).

In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like a LED, and an optical filter, which may change the spectral power distribution of the light generated by the light source. Especially, the "term light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. Especially, herein in embodiments the light generating device may comprise a laser light source.

In embodiments, the terms "laser" or "solid state laser" or "solid state material laser" may refer to one or more of a cerium doped lithium strontium (or calcium) aluminum fluoride (Ce:LiSAF, Ce:LiCAF), chromium doped chrysoberyl (alexandrite) laser, chromium ZnSe(Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147Pm$^{3+}$:glass) solid-state laser, ruby laser (Al$_2$O$_3$:Cr$^{3-}$), thulium YAG (Tm:YAG) laser, titanium sapphire (Ti:sapphire; Al$_2$O$_3$:Ti$^{3-}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc.

For instance, including second and third harmonic generation embodiments, the light source may comprise one or more of an F center laser, an yttrium orthovanadate (Nd:YVO$_4$) laser, a promethium 147 doped phosphate glass (147Pm$^{3+}$:glass), and a titanium sapphire (Ti:sapphire; Al$_2$O$_3$:Ti$^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank may share the same optics.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a diode laser, or a superluminescent diode.

The term "laser light source" may e.g. refer to a diode laser or a solid state laser, etc.

As indicated above, the light generating system may comprise a first light generating device, a second light generating device, and a luminescent material. More especially, in view of color gamut, CRI and/or CCT tunability, the system may further comprise a third light generating device. Further, for controllability, the system may further comprise a control system. Hence, especially the light generating system may comprise a first light generating device, a second light generating device, a third light generating device, a luminescent material, and a control system. Embodiments thereof are further elucidated below.

Especially, the first light generating device may comprise a laser light source. The term "laser light source" may also refer to a plurality of (essentially) the same laser light sources. Especially, the first light generating device is configured to generate first device light. The first device light may have a first device peak wavelength ($\lambda_1$). The first peak wavelength of the first device light may within about +/−5 nm of the centroid wavelength of the first device light. Further, the first device light has a first spectral power distribution.

Especially, the second light generating device may comprise a laser light source. The term "laser light source" may also refer to a plurality of (essentially) the same laser light sources. Especially, the second light generating device is configured to generate second device light. The second device light may have a second device peak wavelength ($\lambda_2$). The second peak wavelength of the second device light may within about +/−5 nm of the centroid wavelength of the second device light. Further, the second device light has a second spectral power distribution, different from the first spectral power distribution.

Especially, the third light generating device may comprise a laser light source. The term "laser light source" may also refer to a plurality of (essentially) the same laser light sources. Especially, the third light generating device is configured to generate third device light. The third device light may have a third device peak wavelength ($\lambda_3$). The third peak wavelength of the third device light may within about +/−5 nm of the centroid wavelength of the third device light. Further, the third device light has a third spectral power distribution, different from the first spectral power distribution and different from the second spectral power distribution.

Hence, the first spectral power distribution, the second spectral power distribution, and the third spectral power distribution may mutually differ.

The term "centroid wavelength", also indicated as λc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma \lambda * I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

Especially, $\lambda_1$ and $\lambda_2$ may be selected from the wavelength range of 420-495 nm, such as in embodiments selected from the wavelength range of 420-490 nm. In specific embodiments, both the first device light and the second device light are blue light.

In specific embodiments, the first device peak wavelength ($\lambda_1$) is selected from the wavelength range of 445-475 nm. More especially, the first device peak wavelength ($\lambda_1$) may be selected from the wavelength range of 450-470 nm. Hence, the first device light may be blue light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

In embodiments, the second device peak wavelength ($\lambda_2$) may be selected from the range of 420-450 nm or from the range of 470-490 nm. Hence, the second device light may in embodiments be blue or blueish light.

In embodiments, $|\lambda_1-\lambda_2|\geq 10$ nm, more especially $|\lambda_1-\lambda_2|\geq 15$ nm. Even more especially $|\lambda_1-\lambda_2|\geq 20$ nm. Hence, the first device light and the second device light may have different color points.

In specific embodiments, colors, or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

Further, in embodiments, $|\lambda_1-\lambda_2|\leq 60$ nm. Good results were obtained when $|\lambda_1-\lambda_2|\leq 50$ nm applies, such as $|\lambda_1-\lambda_2|\leq 45$ nm, and in embodiments $|\lambda_1-\lambda_2|\geq 15$ nm.

In embodiments, the first device peak wavelength ($\lambda_1$) may be selected from the wavelength range of 453-467 nm. In embodiments, the second device peak wavelength ($\lambda_2$) may be selected from the wavelength range of 425-440 nm. Alternatively, in embodiments, the second device peak wavelength ($\lambda_2$) may be selected from the wavelength range of 470-480 nm.

In embodiments, the third device peak wavelength ($\lambda_3$) may be selected from the wavelength range of 590-780 nm, more especially from the wavelength range of 600-650 nm. In specific embodiments, the third device peak wavelength ($\lambda_3$) may be selected from the wavelength range of 610-640 nm. Especially this may be a beneficial choice in view of color gamut, CRI, CCT tunability, and efficiency. In embodiments, the third device peak wavelength ($\lambda_3$) may be selected from the wavelength range of at least 620 nm, such as selected from the range of 620-640 nm. In embodiments, the third device peak wavelength ($\lambda_3$) may be selected from the wavelength range of at maximum 640 nm, such as selected from the range of 610-640 nm.

Hence, the first peak wavelength, the second peak wavelength, and the third peak wavelength may be peak wavelengths of laser light of laser light sources.

Further, the system may comprise a luminescent material.

Here below, some embodiments of a luminescent material are described.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$·Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein $0<x2+x3\leq0.2$, wherein y1+y2=1, wherein $0\leq y2\leq0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of MS:Eu$^{2+}$ and/or $M_2Si_5N_8:Eu^{2+}$ and/or MAlSiN$_3$:Eu$^{2+}$ and/or Ca$_2$AlSi$_3$O$_2$N$_5$:Eu$^{2+}$, etc., wherein M comprises one or more of Ba, Sr, and Ca, especially in embodiments at least Sr. Hence, in embodiments, the luminescent may comprise one or more materials selected from the group consisting of (Ba, Sr, Ca)S:Eu, (Ba, Sr, Ca)AlSiN$_3$:Eu and (Ba, Sr, Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu$^{2+}$). For instance, assuming 2% Eu in CaAlSiN$_3$:Eu, the correct formula could be (Ca$_{0.98}$Eu$_{0.02}$)AlSiN$_3$. Divalent europium will in general replace divalent cations, such as the above divalent alkaline earth cations, especially Ca, Sr, or Ba. The material (Ba, Sr, Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba, Sr, Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca). Likewise, the material (Ba, Sr, Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba, Sr, Ca)S:Eu, (Ba, Sr, Ca)AlSiN$_3$:Eu and (Ba, Sr, Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu$^{2+}$). For instance, assuming 2% Eu in CaAlSiN$_3$:Eu, the correct formula could be (Ca$_{0.98}$Eu$_{0.02}$)AlSiN$_3$. Divalent europium will in general replace divalent cations, such as the above divalent alkaline earth cations, especially Ca, Sr, or Ba.

The material (Ba, Sr, Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba, Sr, Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba, Sr, Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

Especially, the luminescent material may be a broad band emitter.

The luminescent material may be chosen such that an emission band of a full width half maximum (of the luminescent material light) of at least 40 nm, such as at least 50 nm is obtained. For instance, the luminescent material may be chosen such that an emission band of a full width half maximum of at least 60 nm, is obtained. This may e.g. be the case with trivalent cerium comprising garnet luminescent materials (as described herein). Hence, especially the luminescent material may comprise a broad band emitter. The luminescent material may also comprise a plurality of broad band emitters. Especially, when two or more luminescent materials are applied to convert at least part of the first device light and/or at least part of the second device light, at least two of the two or more luminescent materials may be configured to provide respective luminescent material light each having an emission band with full width half maximum (of the luminescent material light) of at least 40 nm, such as at least 50 nm.

Hence, in specific embodiments the luminescent material comprises a luminescent material of the type $A_3B_5O_{12}$:Ce, wherein A comprises one or more of Y, La, Gd, Tb and Lu, and wherein B comprises one or more of Al, Ga, In and Sc. Especially, A may comprises Lu. More especially, in embodiments A comprises at least 40 at. %, more especially at least 50 at. % Lu. Alternatively or additionally, B may comprise at least 90 at. % Al. In embodiments, cerium is available in the amount of 0.01-3 at. %, such as selected from the range of 0.1-2 at. %, like up to about 1 at. %, relative to A (i.e. of all A atoms, 0.01-3% may be Ce).

In embodiments the luminescent material may comprise $(Y,Lu)_3(Al,Ga)_5O_{12}$:Ce, wherein especially cerium may be available in the amount of 0.01-3 at. %, such as selected from the range of 0.1-2 at. %, like up to about 1 at. %, relative to Y+Lu+Ce, wherein Lu is available in the amount of at least 50 at. %, relative to Y+Lu+Ce, and wherein Al is available in the amount of at least 90 at. %, relative to Al+Ga. In embodiments, the luminescent material comprises 0.2-1 at. % cerium relative to A.

Especially, the luminescent material is excitable by the first device light and the second device light. The phrase "is excitable by the first device light and the second device light", and similar phrases, may especially indicate that the luminescent material can be excited by the first device light and by the second device light. However, this does not necessarily mean that during operation the luminescent material is excited by both the first device light and the second device light, as in embodiments in operational modes only one of the first device light and the second device light may be provided.

Hence, the first light generating device may be indicated as "pump" or "pump light source" and the first device light may be indicated as "pump light. Likewise, the second light generating device may be indicated as "pump" or "pump light source" and the second device light may be indicated as "pump light.

Hence, especially the luminescent material is configured to convert at least part of one or more of the first device light and the second device light into luminescent material light. Further, the luminescent material light may have a centroid wavelength $\lambda_{c,1}$ within the green-orange wavelength range. The term green-orange wavelength range may especially refer to the wavelength range of 495-620 nm. Especially, the luminescent material light may have a centroid wavelength $\lambda_{c,1}$ within the green-yellow wavelength range, i.e. within the wavelength range of 495-590 nm.

The luminescent material light may have a luminescent material light spectral power distribution.

Hence, the first spectral power distribution, the second spectral power distribution, the third spectral power distribution, and the luminescent material light spectral power distribution may mutually differ.

Especially, the luminescent material has an absorbance band having a first absorbance E1 at the first device peak wavelength ($\lambda_1$) and a second absorbance E2 at the second device peak wavelength ($\lambda_2$).

The absorbance may be determined with methods known in the art. A transparent phosphor plate can be used in a UV-Vis spectrometer which measures intensity with and without the sample and calculates from the intensities the absorbance. As the absorption is higher at the first peak wavelength, relatively less blue light may remain, than at the second peak wavelength, where more blue light may remain unconverted (than at the first peak wavelength), due to the lower absorption. Hence, especially E2/E1<1. E1 and E2 may be determined from the absorbance spectrum of the luminescent material light.

Especially, the centroid wavelength $\lambda_{c,1}$ of the luminescent material is not too close to the third device light peak wavelength. Hence, in embodiments $|\lambda_{c,1}-\lambda_3| \geq 20$ nm, more especially $\lambda_{c,1}-\lambda_3 \geq 25$ nm, such as in specific embodiments $|\lambda_{c,1}-\lambda_3| \geq 30$ nm. In yet other embodiments, $\lambda_{c,1}-\lambda_3 \leq 150$ nm, such as $|\lambda_{c,1}-\lambda_3| \leq 125$ nm, more especially $|\lambda_{c,1}-\lambda_3| \leq 100$ nm.

As indicated above, the system may further comprise a control system. Especially, the control system may be configured to control at least the first light generating device and the second light generating device. Further, in embodiments the control system may be configured to control the first light generating device, the second light generating device, and the third light generating device.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc., Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc., The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

For instance, in embodiments the control system may be configured to control the first device light and the second device light within a ratio of 1:100-100:1, wherein the ratio is defined by the radiant flux (I1) of the first device light over the radiant flux (I2) of the second device light, i.e. $0.01 \leq I1/I2 \leq 100$. In embodiments, the control system may be configured to control the first device light and the second device light within a ratio of $0.1 \leq I1/I2 \leq 10$. Within such ranges, the CCT may be tuned between a maximum value and a minimum value. Other ranges, however, are herein not excluded. Note that the CCT may be further controlled by controlling the third light generating device. Hence, the control system may further be configured to control the third device light.

The term "radiant flux" may especially refer to the radiant energy emitted per unit time (by the light generating device). Instead of the term "radiant flux", also the terms "intensity" or "radian power" may be applied. The term "radiant flux" may have as unit an energy, like especially Watts. The term "spectral power distribution" especially refers the power distribution of the light (especially in Watts) as function of the wavelength (especially in nanometers), especially in embodiments over the human visible wavelength range (380-780 nm). Especially, the term "spectral power distribution" may refer to a radiant flux per unit frequency or wavelength, often indicated in Watt/nm. Instead of the term "spectral power distribution" also the term "spectral flux" may be applied. Hence, instead of the phrase "controllable spectral power distribution", also the phrase "controllable spectral flux" may be applied. The spectral flux may be indicated as power (Watt) per unit frequency or wavelength. Especially, herein the spectral flux is indicated as the radiant flux per unit wavelength (W/nm). Further, herein spectral fluxes and radiant fluxes are especially based on the spectral power of the device light over the 380-780 nm wavelength range.

In embodiments, the system may be configured to provide white system light. Hence, in an operational mode, the system light may be white light. In embodiments, the system may be able to execute a plurality of operational modes, like e.g. system light having a controllable spectral power distribution. In other embodiments, the operational mode may be a controllable mode wherein the spectral power distribution can be controlled, such as in dependence of a sensor.

Hence, in embodiments the light generating system may be configured to provide in an operational mode white system light.

In specific embodiments, the (white) system light may comprise the first device light, the second device light, and the luminescent material light. More especially, the (white) system light may comprise the first device light, the second device light, the luminescent material light, and the third device light. In embodiments, the white system light may comprise the first device light, the second device light, the luminescent material light, and the third device light, wherein the flux of the first device light to flux of the second device light may be selected from the range of 1:100-100:1, and the flux of the third device light relative to the total flux of the first device light and the second device light may be selected from the range of 1:100-100:1.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In embodiments, the control system is configured to control a spectral power distribution of the system light, wherein the control system is configured to control the correlated color temperature of the system light at a value selected from the range of 1800-6500 K; wherein the correlated color temperature of the system light is controllable over a CCT control range of at least 500 K within the range of 1800-6500 K, such as controllable over a CCT control range of at least 1000 K. For instance, the CCT of the system light may controllable between 2700-4000 K (i.e. over a CCT control range of 1300 K), or over a range of 2000-4500 K (i.e. over a CCT control range of 2500 K).

In embodiments, R9 may be at least 0, such as especially be at least 20 or even more especially at least 30. Alternatively, the R9 value may be controllable, such as over a range of at least 20 (like e.g. between 20-40). In specific embodiments, the control system may be configured to control (in the first operational mode) the R9 value of the system light at a value of at least 30; wherein the R9 value of the system light may be controllable over a R9 control range of at least 30, wherein the R9 control range at least partly overlaps with the range of at least 30. Further, in specific embodiments (in the first operational mode) the color rendering index of the system light may be at least 80.

In embodiments, the control system may be configured to control R9 value of the system light at a value of at least 30; and the color rendering index of the system light may be at least 75, such as at least 80, like in embodiments at least about 85.

Note that the CRI may also depend upon the spectral power composition. Hence, different types of white light may have different CRI values and/or different R9 values.

In specific embodiments, the correlated color temperature of the system light may be controllable over a CCT control range of at least 1000 K within the range of 2000-6000 K.

As indicated above, the second device peak wavelength ($\lambda_2$) may be selected from the range of 420-450 nm. Alternatively, the second device peak wavelength ($\lambda_2$) may be selected from the range of 470-490 nm. In view of energy efficiency, the latter may be desirable over the former. In view of CCT tunability, the former may be desirable over the latter.

In specific embodiments, there may be two second device peak wavelengths, provide by two different second light generating devices, one type of second light generating devices configured to generate second device light with the second device peak wavelength ($\lambda_2$) may be selected from the range of 420-450 nm and another type of second light generating devices configured to generate second device light with the second device peak wavelength ($\lambda_2$) may be selected from the range of 470-490 nm.

In embodiments, the first light generating device and the second light generating device are arranged in a single laser bank. Alternatively or additionally, the system may comprise a plurality of first light generating devices configured in a single laser bank. Alternatively or additionally, the system may comprise a plurality of second light generating devices configured in a single laser bank. The latter two single laser banks may be different or may be the same. In embodiments lasers in a laser bank may share the same optics.

In embodiments, $E2/E1 \leq 0.5$, more especially $E2/E1 \leq 0.3$. In other embodiments, $E2/E1 \geq 0.01$. A too low value may not provide enough luminescent material light when using the second light generating device. A too high value may not allow a broad CCT tunability.

The luminescent material may be configured in the reflective mode or in the transmissive mode. In the transmissive mode, it may be relatively easy to have light source light admixed in the luminescent material light, which may be useful for generating the desirable spectral power distribution. In the reflective mode, thermal management may be more easy, as a substantial part of the luminescent material may be in thermal contact with a thermally conductive element, like a heatsink or heat spreader. In the reflective mode, a part of the light source light may in embodiments be reflected by the luminescent material and/or a reflector and may be admixed in the luminescent material light. The reflector may be configured downstream of the luminescent material (in the reflective mode).

A thermally conductive element especially comprise thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

The thermally conductive element may comprise a heatsink. Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof. A heatsink especially comprises (more especially consists of) a thermally conductive material. The term "heatsink" may also refer to a plurality of (different) heatsinks. The thermally conductive element may comprise a heat spreader. A heat spreader may be configured to transfer energy as heat from a first element to a second element. The second element may especially be a heatsink or heat exchanger. A heat spreader may passive or active. Embodiments of passive heat spreaders may comprise a plate or block of material having high thermal conductivity, such as copper, aluminum, or diamond. An active heat spreader may be configured to speed up heat transfer with expenditure of energy as work supplied by an external source. Herein, the heat spreader may especially be a passive heat spreader. Alternatively or additionally, the heat spreader may be an active heat spreader, such as selected from the group of heat pipes and vapor chambers. A heat spreader especially comprises (more especially consists of) a thermally conductive material. The term "heat spreader" may also refer to a plurality of (different) heat spreaders.

The luminescent material, such as in embodiment the luminescent body, may be in thermal contact with the thermally conductive material, such as a thermally conductive body. Instead of the term "thermal contact", and similar terms, also the term "thermally coupled", and similar terms, may be applied.

An element may be considered in thermal contact with another element if it can exchange energy through the process of heat. Hence, the elements may be thermally coupled. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 µm, though larger distances, such as up to 100 µm may be possible. The shorter the distance, the better the thermal contact. Especially, the distance is 10 µm or less, such as 5 µm or less, such as 1 µm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 µm or less (though larger average distances may be possible, such as up to 100 µm). In embodiments, the two surfaces of the two elements may be kept at a distance with one or more distance holders. When two elements are in thermal contact, they may be in physical contact or may be configured at a short distance of each other, like at maximum 10 µm, such as at maximum 1 mm. When the two elements are configured at a distance from each other, an intermediate material may be configured in between, though in other embodiments, the distance between the two elements may filled with a gas, liquid, or may be vacuum. When an intermediate material is available, the larger the distance, the higher the thermal conductivity may be useful for thermal contact between the two elements. However, the smaller the distance, the lower the thermal conductivity of the intermediate material may be (of course, higher thermal conductive materials may also be used).

With respect to the reflective mode, in embodiments part of the first device light may be directed to the luminescent material and part of the first device light may bypass the luminescent material. Likewise, with respect to the reflective mode, in embodiments part of the second device light may be directed to the luminescent material and part of the second light may bypass the luminescent material. In embodiments, also with respect to the transmissive mode, in embodiments part of the first device light and/or part of the second device light may be directed to the luminescent material and part of the first device light and/or part of the second device light may bypass the luminescent material.

When pump light may have a spectral power distribution that may be used for both pumping the luminescent material and admixing in the system light, several options may be chosen. In embodiments, a plurality of first light generating devices may be applied, wherein one or more are used to pump the luminescent material, and one or more other first light generating devices are configured to provide first device light that bypasses the luminescent material. Alternatively or additionally, one or more first light generating devices may be used to generate first device light of which part is directed to the luminescent material and of which another part may be configured to bypass the luminescent material. This may be done e.g. via a beam splitter. Light may bypass the luminescent material when it is not irradiating (in transmissive or reflective mode) the luminescent material.

In the reflective mode, a dichroic reflector may be used, to promote the luminescent material light over the (first and/or second) device light. The former may be transmitted with a higher transmission than the latter and the latter may be reflected with a higher reflection than the former.

Hence, in specific embodiments the light generating system may further comprise a dichroic element, configured to transmit or reflect (first and/or second) device light and configured to reflect or transmit the luminescent material light. The dichroic element may be an embodiment of a color separation element, such as described in U.S. Pat. No. 7,070,300, which is herein incorporated by reference. Especially, the color separation element may be selected from the group of a dichroic mirror, a dichroic cube, and a diffractive optical element. Optionally, the color separation element maybe provided using a hologram. Especially, the dichroic element may be a dichroic mirror or reflector.

Hence, in embodiments the (white) system light may comprise the first device light, the second device light, the luminescent material light, and optionally the third device light, wherein the first device light is at least partly provided by one or more first light generating devices configured to generate first device light that bypasses the luminescent material.

Good results may be obtained with the first luminescent material light having a dominant wavelength selected from the range of about 562-582 nm, such as in embodiments a dominant wavelength selected from the range of 563-580 nm. Especially, the luminescent material light may have a dominant wavelength selected from the range of 565-577 nm. Even more especially, the luminescent material light may have a dominant wavelength selected from the range of 567-577 nm.

In view of using the transmissive mode and/or in view of thermal management and/or in view of robustness, the luminescent material may be comprised by a single crystal or a ceramic body. Hence, in system may comprise a single crystal comprising (or being) the luminescent material. Alternatively or additionally, the system may comprise a ceramic body comprising (or being) the luminescent material.

Ceramic bodies are known in the art. Especially, the ceramic material may be obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

Hence, in specific embodiments, the luminescent material light may have a dominant wavelength selected from the range of 567-577 nm; the light generating system may comprise a ceramic body, wherein the ceramic body comprises the luminescent material; the luminescent material may be operated in the reflective mode; the ceramic body may comprise at least one face thermally coupled to a thermally conductive body, especially a reflective thermally conductive body, the light generating system may further comprise an optical element configured downstream of the luminescent material, wherein the optical element is reflective for the first device light and transmissive for the luminescent material light. As indicated above, the optical element may comprise a dichroic mirror. Further, the reflective thermally conductive body may be reflective for at least the first device light. Further, it may be reflective for the second device light. It may also be reflective for the luminescent material light. The thermally conductive body may be reflective as such or may comprise a reflective coating.

As indicated above, the luminescent material may be comprised by a body. Such body may be indicated as "converter body" or "luminescent body". In embodiments, the luminescent body may be a luminescent single crystal or a luminescent ceramic body.

In embodiments, the converter body ("body") may have lateral dimensions, like width or length (W1 or L1) or diameter (D1), and a thickness or height (H1). The length or width or the diameter are indicated as converter body dimensions. Though the thickness or height may also be considered a converter body dimension, the term converter body dimension is especially used in relation to width or length (W1 or L1) or diameter (D1). These converter body dimensions may substantially be larger than the thickness or height (H1). Hence, the converter body may have one or more converter body dimensions (D) defined perpendicular to the converter body height (H1).

In embodiments, (i) D1≥H1 or (ii) and W1≥H1 and/or L1≥H1. In specific embodiments, L1≤100 mm, such as especially L1≤60 mm, more especially L1≤50 mm, most especially L1≤40 mm. In specific embodiments, W1≤100 mm, such as especially W1≤60 mm, more especially W1≤50 mm, most especially W1≤40 mm.

In specific embodiments, H1≤1 mm, such as especially H1≤0.5 mm, more especially selected from the range of 5-500 μm, like selected from the range of 50-500 μm, such as selected from the range of 100-300 μm.

In specific embodiments, D1≤100 mm, such as especially D1≤60 mm, more especially D1≤50 mm, most especially D1≤40 mm. Further, the body may have lateral dimensions (width/diameter) in the range 500 μm-100 mm, like 0.1-40 mm. In yet further specific embodiments, (i) D1>H1 or (ii) W1>H1 and W1>H1. Especially, the lateral dimensions like length, width, and diameter are at least 2 times, like at least 5 times, larger than the height. In specific embodiments, the converter body has a first length L1, a first height H1, and a first width W1, wherein H1≤0.5*L1 and H1≤0.5*W1. Hence, the converter body may have a tile shape. The converter body may have a rectangular cross-section or a circular cross-section, though other cross-sections may also be possible. In embodiments, the converter body height may be selected from the range of 50-500 μm, such as e.g. 100-300 μm.

Further, in specific embodiments the one or more converter body dimensions (D) may be selected from the range of 0.1-40 mm. In specific embodiments, H1/D1≤0.5. Yet, in embodiments the one or more converter body dimensions (D) may be selected from the range of 0.1-30 mm, such as 0.1-20 mm, like in specific embodiments 0.1-10 mm, like at least 0.2 mm, such as at least 2 mm. Hence, in embodiments a thickness of the luminescent body may be in a range from 100 to 300 μm.

Downstream of the luminescent material and the first device and the second device, and the optional third device, optics may be configured. Hence, in embodiments system light may escape from the system only via such optics.

The term "optics" may especially refer to (one or more) optical elements. Hence, the terms "optics" and "optical elements" may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. In embodiments, the optics may comprise an integrator, like a "Koehler integrator" (or "Köhler integrator"). Especially, the optics may be used for beam shaping and/or light mixing of the first device light, the second device light, the luminescent material light, and the optional third device light.

In specific embodiments, the system only comprises lasers as light generating devices. In specific embodiments, the system only comprises first light generating devices, second light generating devices, and third light generating devices as light generating devices (and of course the luminescent material). In embodiments, each of the first light generating devices, second light generating devices, and third light generating devices may be laser light sources.

In specific embodiments, a compact package may e.g. be provided. For instance, in embodiments the system may comprise an integrated light source package, wherein the integrated light source package comprises a common support member configured to support the first light generating device, the second light generating device, the third light generating device, and the luminescent material, wherein common support member comprises a thermally conductive support. The thermally conductive support may comprise one or more of a heatsink, a heat spreader, and a vapor chamber.

In embodiments, the first light generating device and the second light generating device are configured to provide the device light under an angle with a face of the luminescent body, such as under an angle of 30-85°.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc, etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, a photochemical reactor, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of first light generating device, the second light generating device, the option third light generating device, etc.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Amongst others, it is herein proposed to use a configuration where blue lasers with two different wavelengths are used for exciting the blue phosphor. A third red laser may also combined for producing wide range BBL dimmable high intensity white light source. The light sources may be arranged to operate in the transmissive mode (go through the luminescent material, such as a ceramic luminescent body) or in the reflective mode (partly reflected at the luminescent material, such as a ceramic luminescent body) so that well mixed white light is obtained. The first blue light may e.g. be in the range of 450-470 nm, and may be absorbed by the luminescent material, such as a ceramic luminescent body, to a larger extent than the second blue light. The second blue light may e.g. be in the range of 420-450 nm or 470-490 nm, and may be absorbed by the luminescent material, such as a ceramic, to a lower extent than the first blue light. Especially, peak differences between the used blue light may be at least 10 nm. The peak wavelength of the red light may e.g. be in the range of 610-640 nm. The dominant wavelength of the emission from the luminescent material, such as a ceramic luminescent body, may e.g. be in the range 565-577 nm, such as 567-577 nm. In specific embodiments, a peak absorbance in the 450-470 nm wavelength range may especially not be lower than 0.85.

Figure 1:
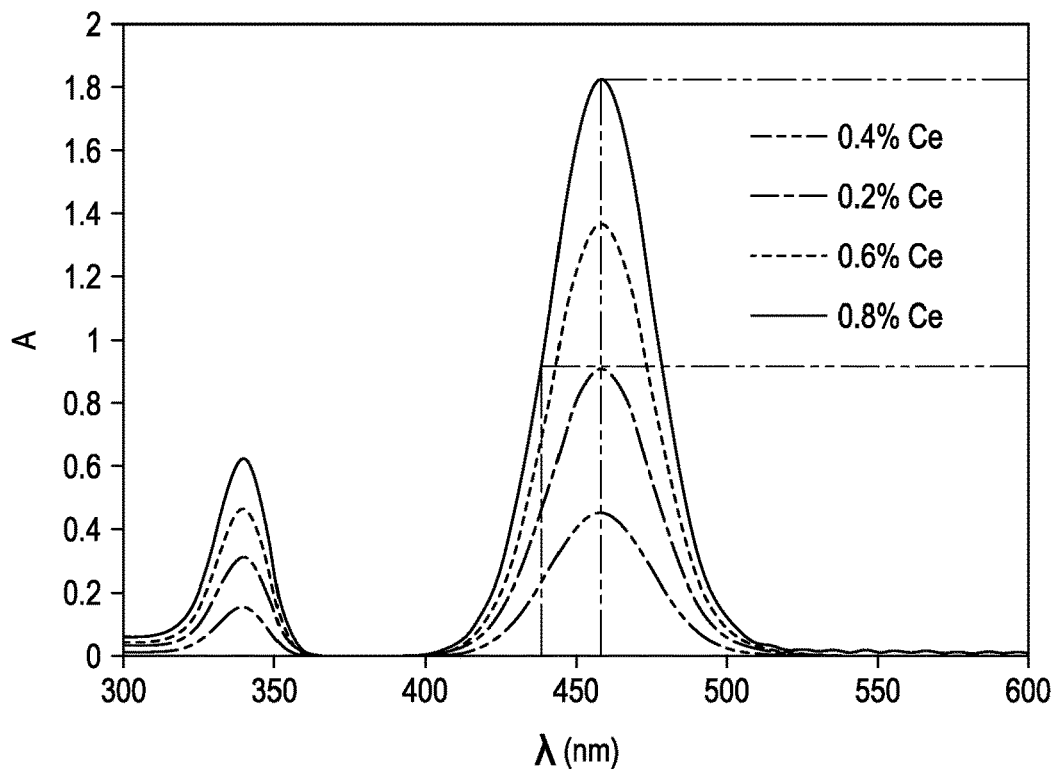
FIGS. 1-8 show some examples and results.
Figure 2:
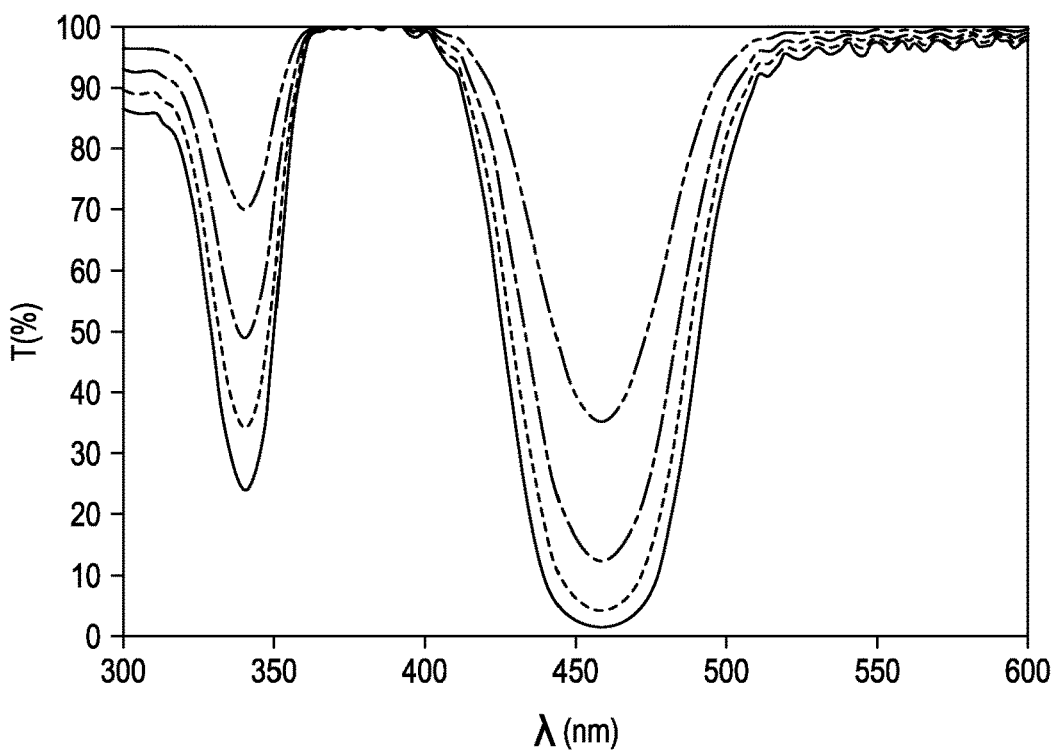

In embodiments, herein the use of a garnet phosphor in the reflection or in the transmissive mode is proposed, where two blue lasers emitting at two different wavelengths which may be absorbed to a different extent by the ceramic phosphor. FIGS. 1 and 2 shows (a) the absorbance (FIG. 1) and transmission (FIG. 2) of a 150 micron thick transparent sample (0.2% Ce) Ce:YAG samples as a function of wavelength. Also higher concentration samples, up to 0.8% Ce (i.e. up to 0.8 at. % Ce relative to "A", see also above). In these figures also the dependence of absorbance on Ce concentration in the transparent ceramic garnet sample is shown.

The excitation spectrum at maximum emission, e.g. 567-577 nm, may substantially be the same as the absorption spectrum of FIG. 1 or at least have a corresponding shape. Absorbance spectra and excitation spectra of different cerium comprising garnets, and all other kinds of luminescent materials are known in the art.

Referring to FIG. 1, at 0.8% Ce (i.e. 0.8 at. % Ce) a ratio of an absorbance E1 at about 465 nm to an absorbance E2 at e.g. about 430 nm may be about 1.8:0.9. Hence, E2/E1≈0.5 in this example. E1 is indicated by the higher horizontal dashed-dotted line intercepting the absorption at about 465 nm, and E2 is indicated with the lower horizontal dashed-dotted line, intercepting the absorption at about 430 nm.

In FIG. 2 (but effectively also in FIG. 1), it can be seen that in the wavelength range 450-470 nm the peak transmittance flattens especially at higher cerium concentrations, and rapid increase in transmittance in wavelength ranges 420-450 nm and 470-490 nm (corresponding to the sides of the peak) is observed. In order to obtain BBL tuning in a wide temperature range it may be desirable to have low amount of blue in garnet emission in order to have a color point close to the dominant wavelength of the phosphor. This may imply that the peak absorbance (450-470 nm) may be higher than about 0.85. In the wavelength ranges 420-450 nm and 470-490 nm wavelength choice may determine to what extent blue light is absorbed and in what wavelength range the BBL will be followed.

Figure 3:
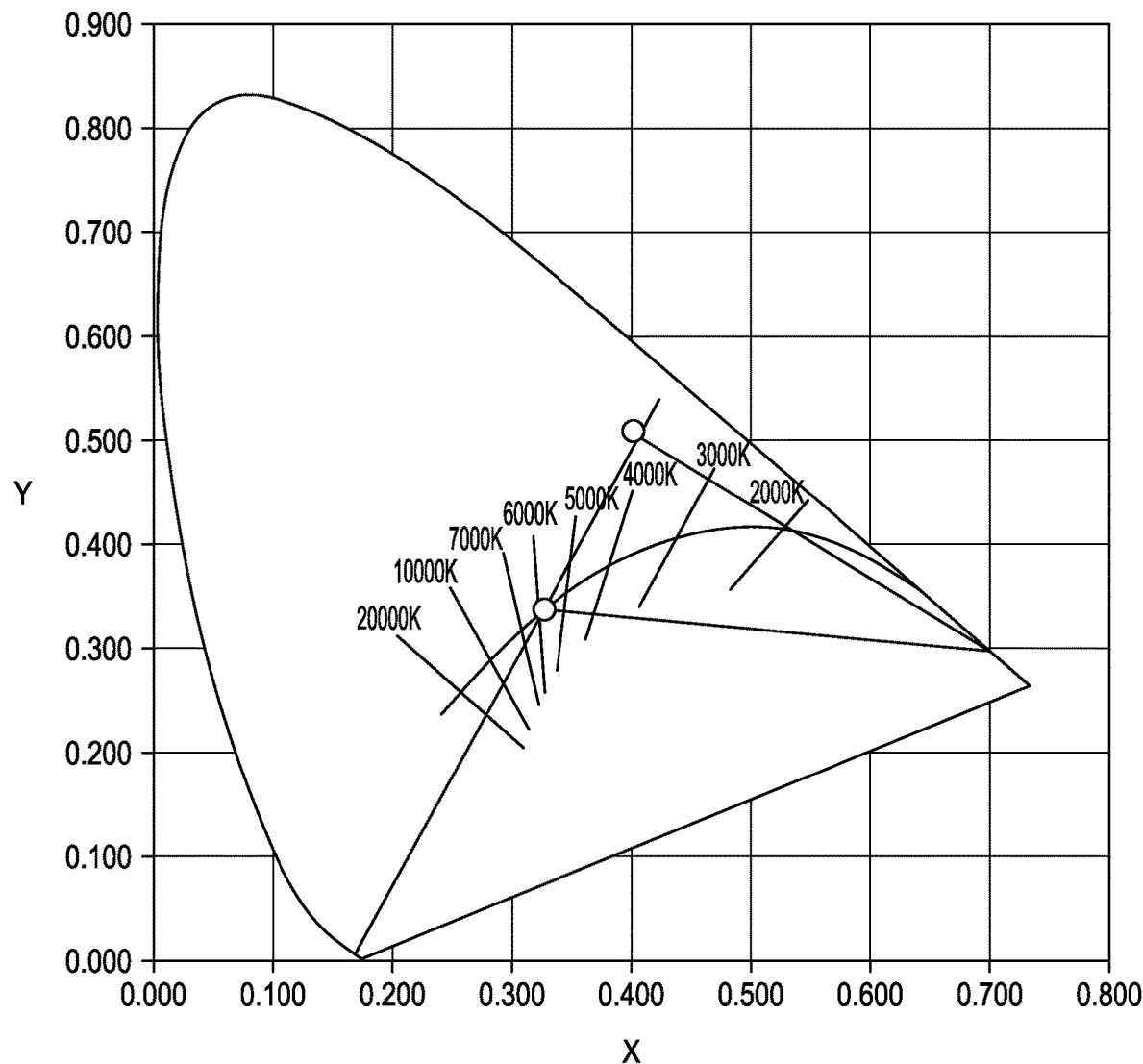

In example shown in FIG. 3 color tuning using two blue wavelengths is schematically depicted. Assuming using e.g. a cerium comprising garnet, the dominant wavelength of such material may e.g. be about 570 nm. Assume using a 430 nm peak wavelength light generating device for the low wavelength blue and a 465 nm peak wavelength light generating device for high wavelength blue, all color points along the line connecting these two points can be obtained. When these wavelengths used for pumping the garnet are combined with e.g. a 620 nm peak wavelength red light then any color point within the triangle connecting all these three color points can be obtained. Considering part of BBL is also in this area means that the color points falling onto the BBL segment within this area can also be produced. This means that with these three wavelengths BBL dimming can be realized between CCT=2000 K and CCT=6000 K. This is schematically depicted in FIG. 3.

Figure 4:
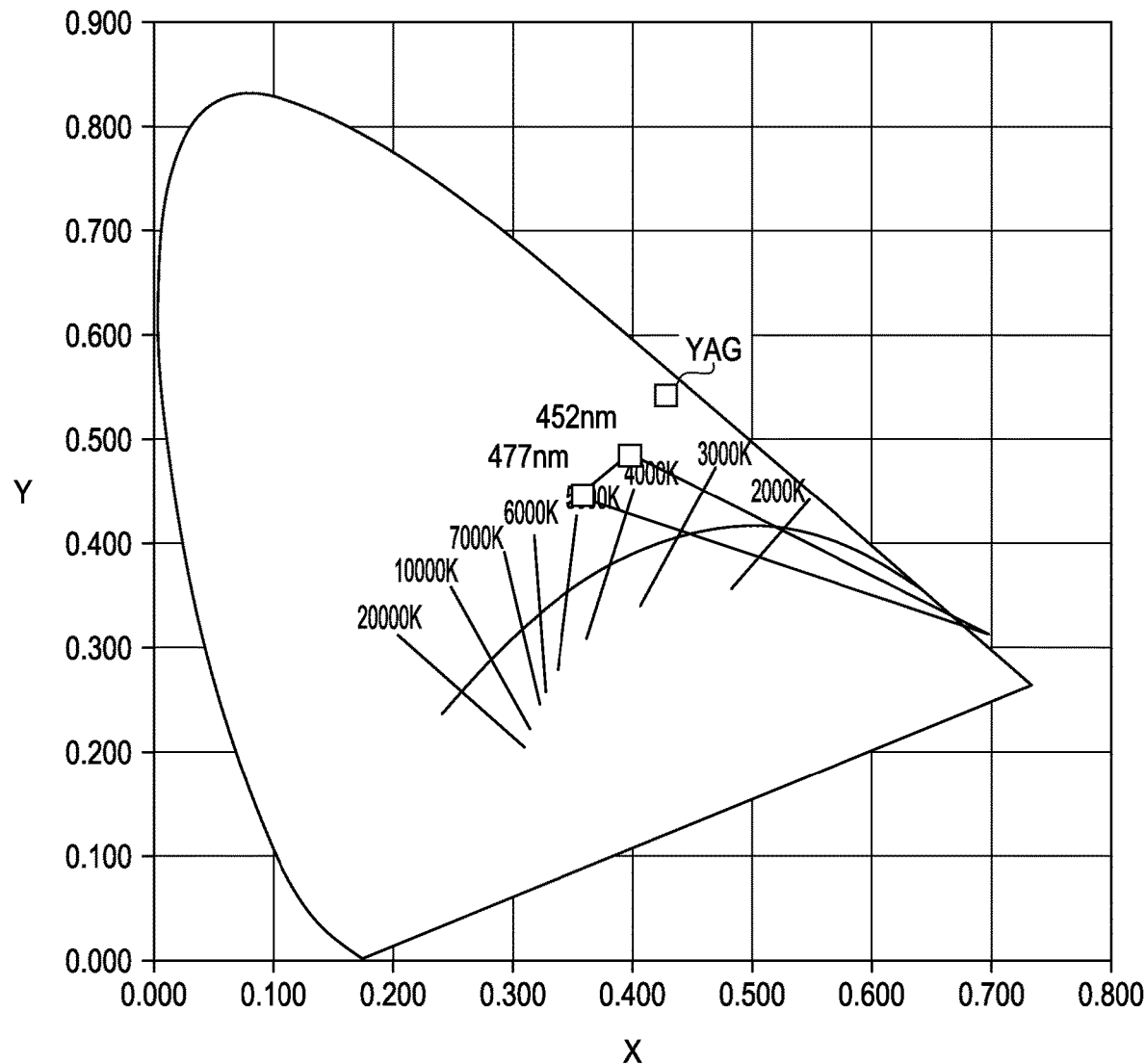

In FIG. 4 essentially the same as above is applied but using e.g. 477 nm and 452 nm peak wavelengths light generating devices. It can be seen that the range of BBL may be confined to about 2000-3000 K. The color point indicated with YAG refers to the emission of the garnet based luminescent material only.

Figure 5:
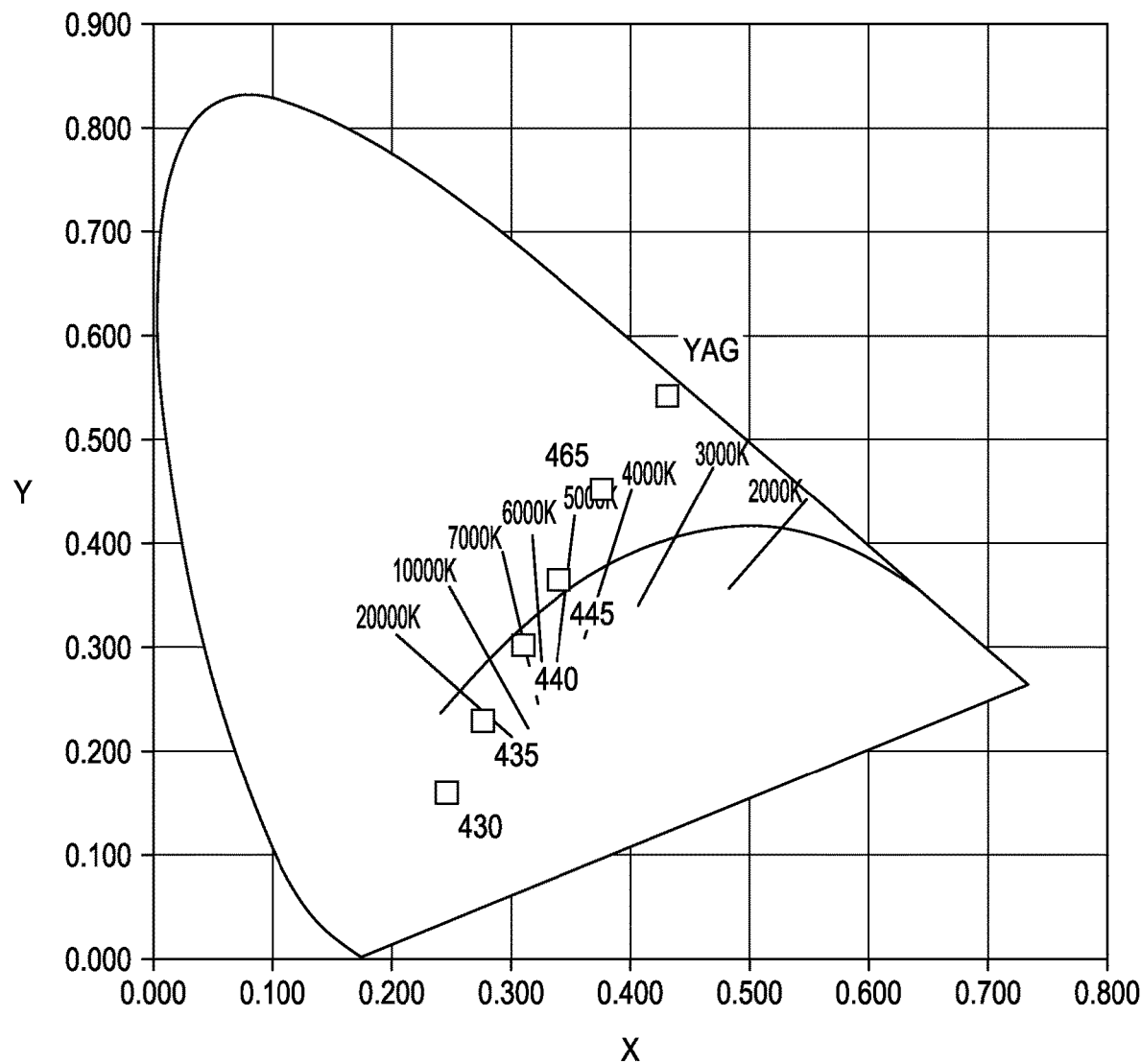

Amongst other, color points for a garnet with an absorbance of 0.95 at 465 nm was calculated. FIG. 5 shows color points for lasers emitting at various wavelengths. From this figure it can be seen that garnet excited at about 465 nm is combined with an absorbance 445 nm, BBL dimming between 6000 K and 3000 K can be obtained. When instead of a 445 nm laser a laser with a 430 nm emission is used, BBL dimming may still be between about 6000 K and 3000 K, and off-BBL dimming can even be done up to about 20000 K.

Further modelling of a garnet with an absorbance of 1.27 at absorbance at 465 nm, and absorbance at 430 nm was applied. When using lasers with these wavelengths in combination with a 625 nm laser, it appears possible to execute BBL dimming between about 2000 K and 6000 K.

Figure 6:
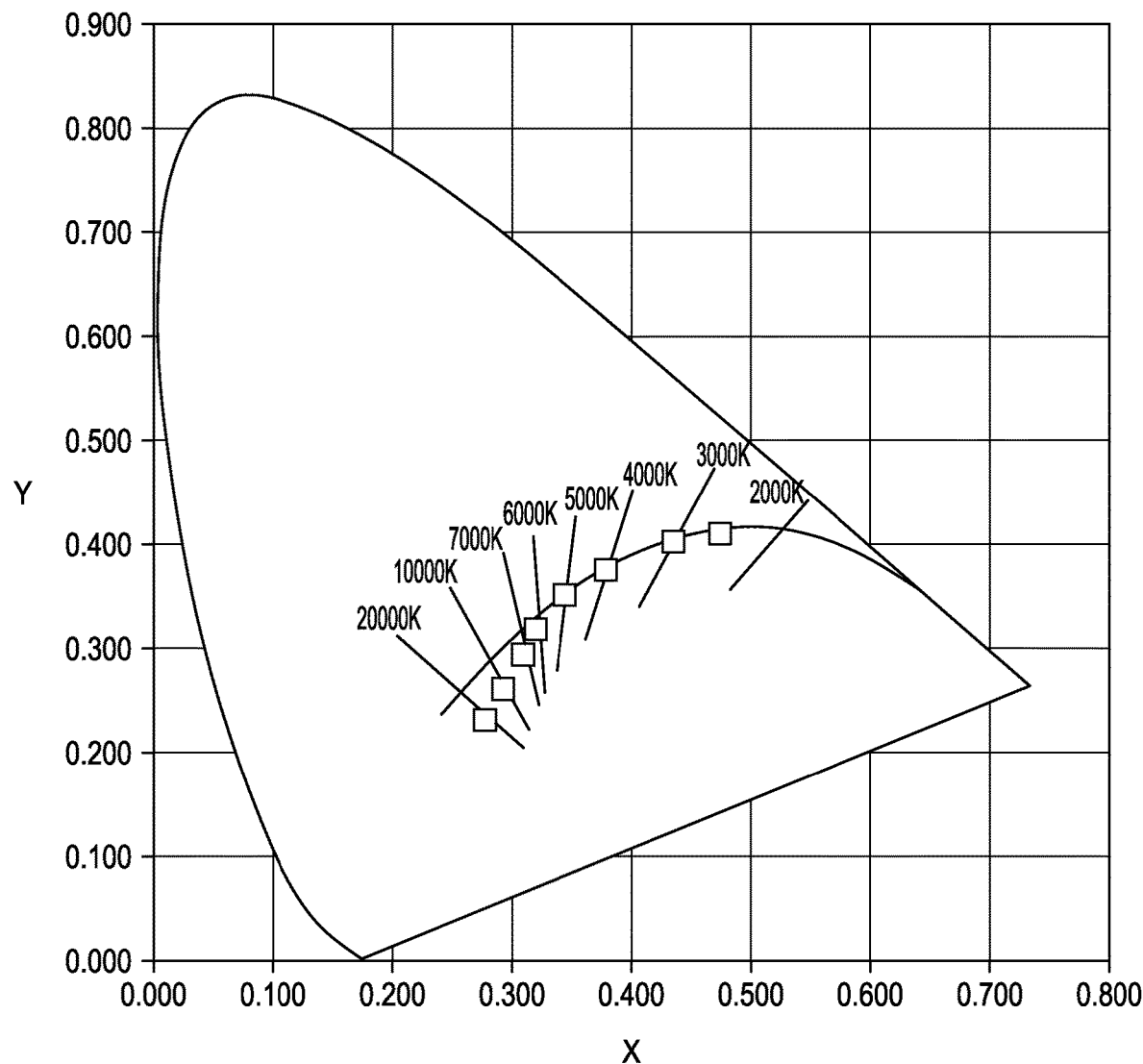
Figure 7:
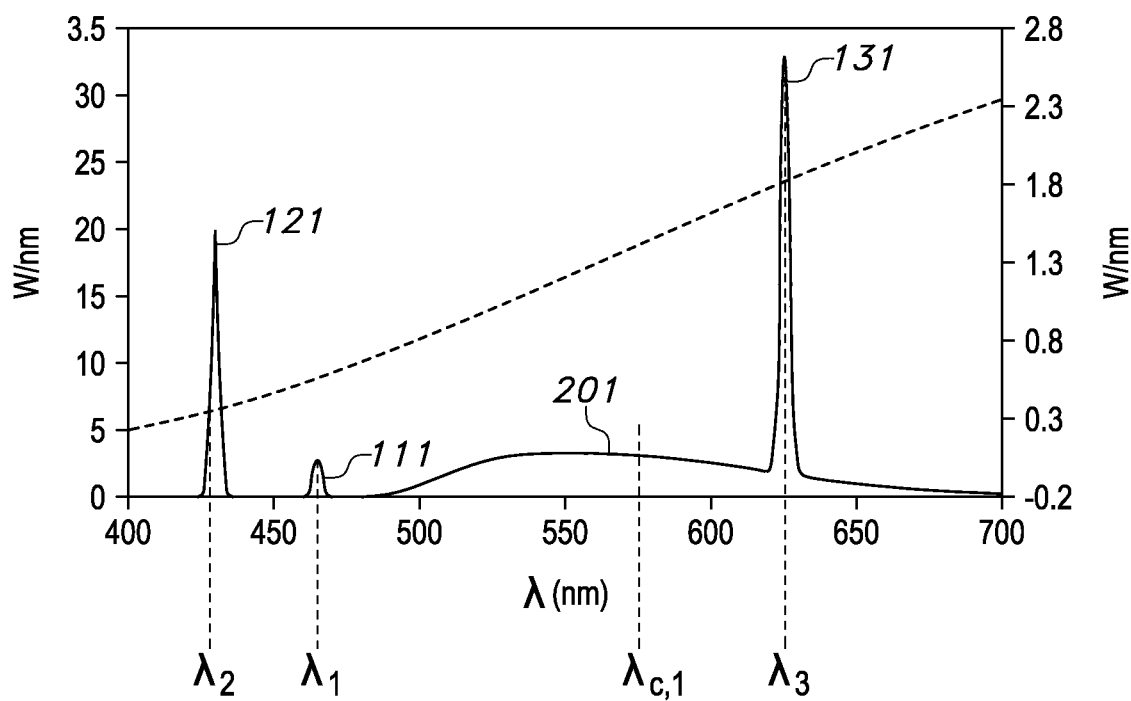

Referring to FIGS. 6-7, 430 nm emission, 465 nm emission, 625 nm emission was provided, e.g. via lasers; absorbance at 430 nm was A=0.15 and for 465 nm A=1.27. In FIG. 6 the color point at various intensity ratios of 465 nm and 430 nm is shown. Here it can be seen that even below 6000 K BBL dimming becomes possible. FIG. 7 shows an emission spectrum for CCT=3000 K. Reference 121 indicates the second device light with peak wavelength $\lambda_2$; reference 111 indicates the first device light with peak wavelength $\lambda_1$; reference 131 indicates the third device light with peak wavelength $\lambda_3$; reference 201 indicates the luminescent material light with a centroid wavelength $\lambda_{c,1}$. The dashed line indicates the spectral power distribution of a black body radiator at 3000 K.

In the below table, the properties of white light described above is listed. It can be seen that at all CCT CRI does not reach 90.

| 430 nm, 465 nm, 625 nm A = 0.33 at 430 nm and A = 1.27 at 465 nm | | | | |
|---|---|---|---|---|
| CCT(K) | CRI | R9 | Lum/Wb | Lum/W |
| 20000 | 52 | 50 | 211 | 230 |
| 10000 | 57 | 21 | 230 | 254 |
| 70000 | 60 | −10 | 250 | 281 |
| 6000 | 60 | −30 | 263 | 299 |
| 5000 | 64 | −16 | 277 | 322 |
| 4000 | 74 | 42 | 280 | 333 |
| 3000 | 86 | 94 | 278 | 342 |
| 2500 | 86 | 77 | 270 | 339 |

Figure 8:
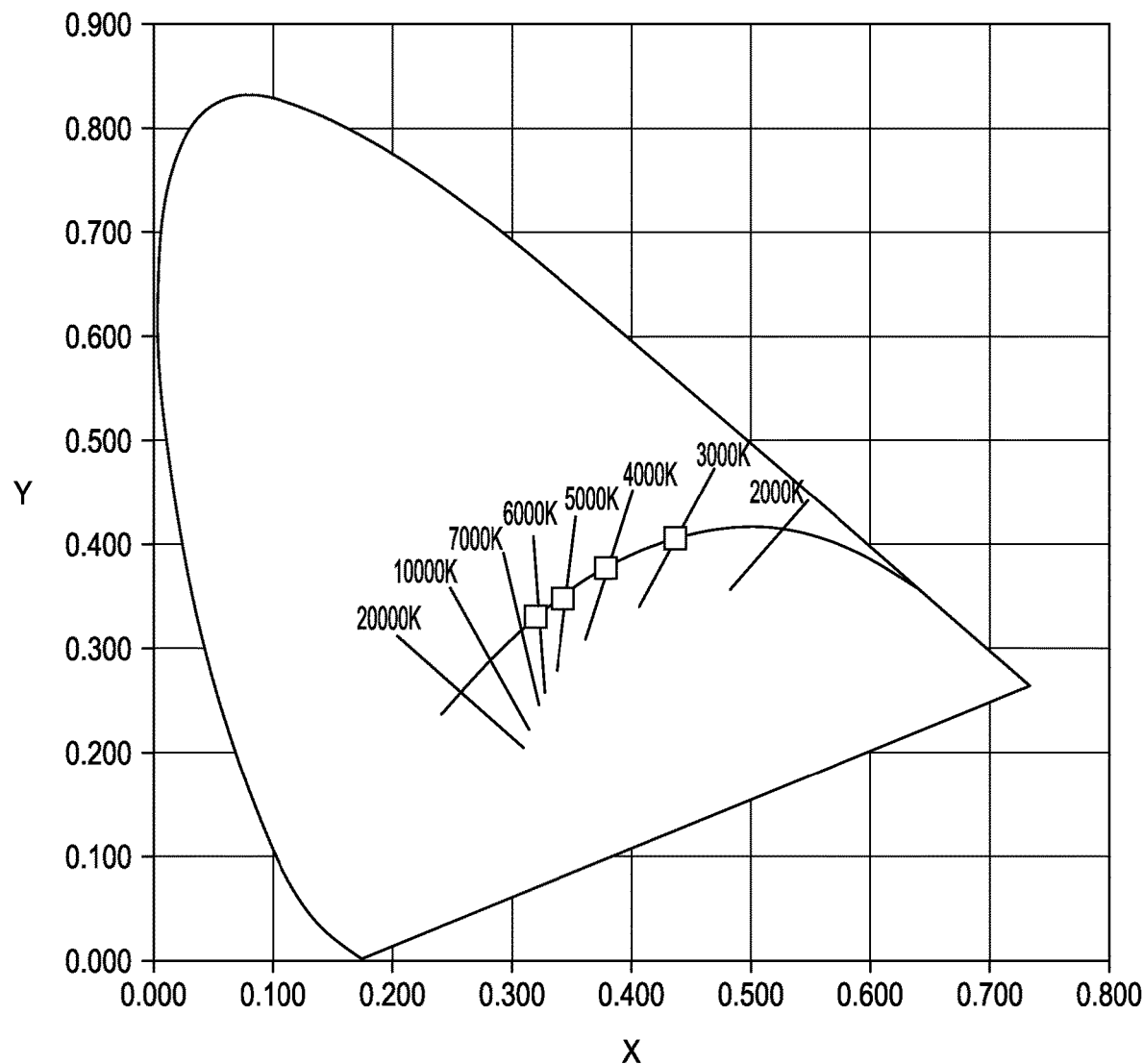

In an alternative example, also 430 nm, 465 nm, and 625 nm, but absorbance at 465 nm was 0.95 and at 430 nm was A=0.25. In FIG. 8 the color point at various intensity ratios of 430 nm light and 465 nm light are shown. Here it can be seen that as expected above 6000 K BBL dimming becomes possible. However due to lower absorbance going to CCT lower than about CCT=3000 K is not possible.

The below table lists the properties of light described above. With this garnet phosphor with a absorbance at 465 nm CCT tuning is not possible below CCT=3000 K however CRI of 93 is obtained at CCT=3000 K.

| 430 nm, 465 nm, 625 nm, A = 0.25 at 430 nm and A = 0.95 at 465 nm | | | | |
|---|---|---|---|---|
| CCT(K) | CRI | R9 | Lum/Wb | Lum/W |
| 6000 | 67 | −32 | 269 | 309 |
| 5000 | 75 | 18 | 273 | 319 |
| 4000 | 85 | 66 | 278 | 334 |
| 3000 | 93 | 83 | 278 | 344 |

In another simulation, 440 nm, 465 nm, 625 nm, and absorbance at 440 nm A=0.57 and at 465 nm A=0.95 was applied. As expected, above 6000 K BBL dimming becomes possible. However due to lower absorbance going to CCT lower than about CCT=3000 K is not possible.

The below Table lists the properties of light described above. With this garnet phosphor with a absorbance at 465 nm, the CCT tuning is in a smaller range but a CRI of 93 is obtained at a CCT=3000 K.

| 440 nm, 465 nm, 625 nm, A = 0.95 at 465 nm, and A-0.57 at 440 nm | | | | |
|---|---|---|---|---|
| CCT | CRI | R9 | Lum/Wb | Lum/W |
| 5000 | 72 | 2 | 286 | 338 |
| 4000 | 84 | 65 | 283 | 342 |
| 3000 | 93 | 84 | 277 | 344 |

In another simulation, 477 nm, 452 nm, 620 nm, emitting light sources are used, and absorbance at 452 nm was A=1.27 and absorbance at 477 nm was A=0.75. As expected the BBL range is relatively small. In order to get a wider CCT range it is better to be on the low wavelength range with the second device light, like e.g. 420-450 nm.

The table below shows the properties of light which can be produced thereby are shown.

| 477 nm, 452 nm, 620 nm, A = 1.27 at 452 nm and A = 1.27 at 477 nm | | | | |
|---|---|---|---|---|
| CCT | CRI | R9 | Lum/Wb | Lum/W |
| 2456 | 87 | 77 | 287 | 351 |
| 2792 | 81 | 88 | 280 | 338 |

In below table, the effect of the red laser on various properties is shown with absorbance at 430 nm and 465 nm, a contribution at 625 nm, with A=0.33 at 430 nm, and A=1.27 at 465 nm, at CCT 3000 K:

| 430 nm, 465 nm, A = 0.33 at 430 nm, and A = 1.27 at 465 nm | | | | | | |
|---|---|---|---|---|---|---|
| λr/nm | CCT/K | CRI | R9 | Lum/Wb | Lum/W | λ2/nm | λ1/nm |
| 640 | 3000 | 80 | 11 | 236 | 297 | 465 | 430 |
| 635 | 3000 | 81 | 31 | 253 | 315 | 465 | 430 |
| 630 | 3000 | 86 | 61 | 266 | 330 | 465 | 430 |
| 625 | 3000 | 86 | 94 | 278 | 342 | 465 | 430 |
| 620 | 3000 | 90 | 58 | 288 | 355 | 465 | 430 |

Figure 9A:
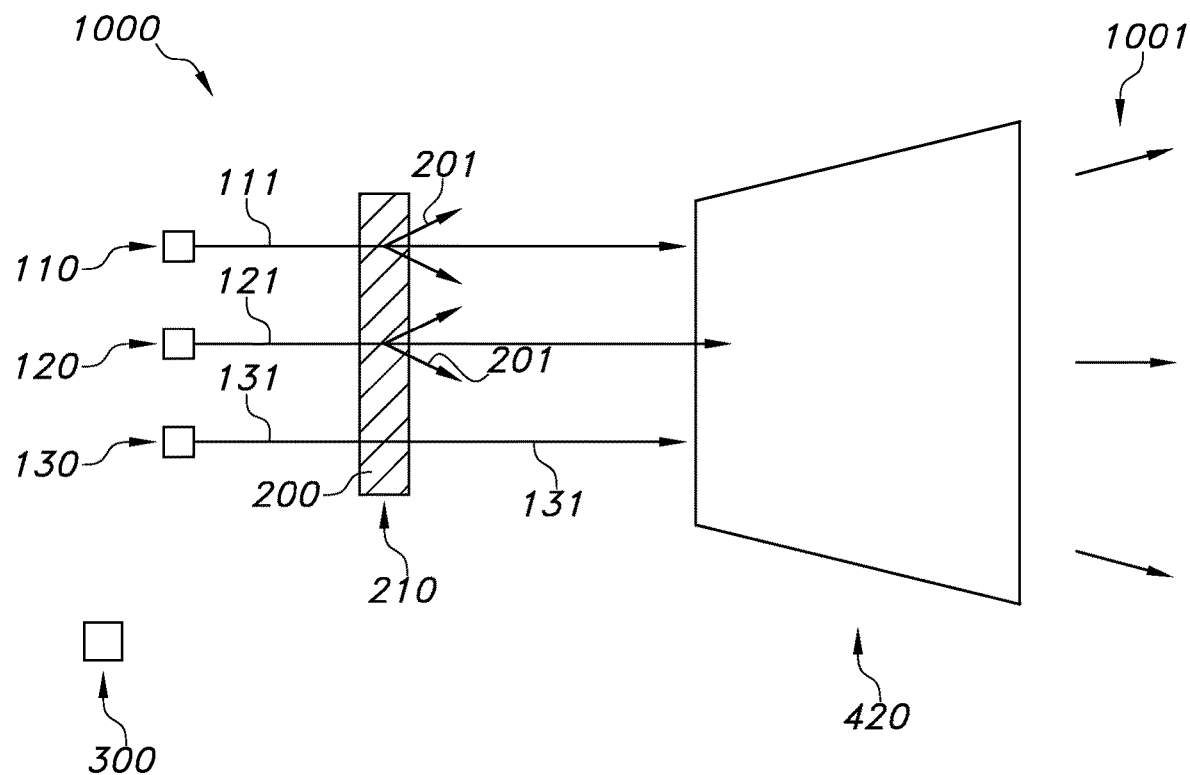
FIGS. 9a-9c schematically depict some aspects and embodiments.
Figure 9B:
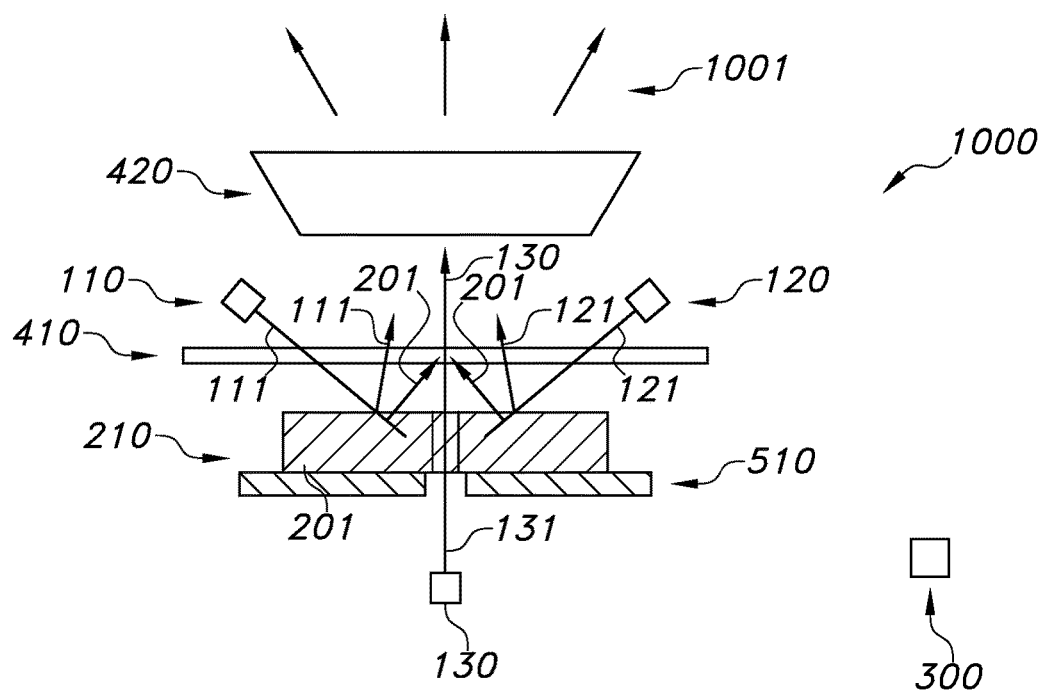
Figure 9C:
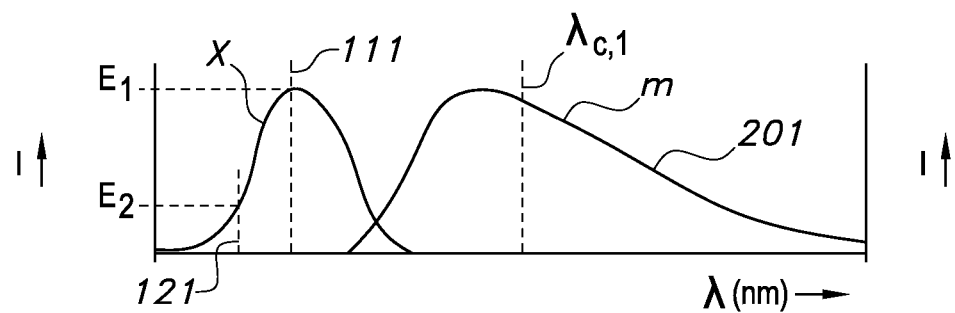

Referring to FIGS. 9a-9c, embodiments of a light generating system 1000 comprising a first light generating device 110, a second light generating device 120, an optional third light generating device 130, a luminescent material 200, and an optional control system 300, are schematically depicted.

The first light generating device 110 may comprise a laser light source and may be configured to generate first device light 111 having a first device peak wavelength $\lambda_1$ and having a first spectral power distribution. The first device peak wavelength $\lambda_1$ may be selected from the wavelength range of 445-475 nm. The first device peak wavelength $\lambda_1$ may especially be selected from the wavelength range of 450-470 nm.

The second light generating device 120 may comprise a laser light source and may be configured to generate second device light 121 having a second device peak wavelength $\lambda_2$ and having a second spectral power distribution, different from the first spectral power distribution. The second device peak wavelength $\lambda_2$ may be selected from the range of 420-450 nm or from the range of 470-490 nm.

The luminescent material 200 may be excitable by the first device light 111 and the second device light 121. The luminescent material 200 may be configured to convert at least part of one or more of the first device light 111 and/or the second device light 121 into luminescent material light 201 having a centroid wavelength $\lambda_{c,1}$ within the green-orange wavelength range. The luminescent material 200 has an absorbance band having a first absorbance intensity E1 at the first device peak wavelength $\lambda_1$ and a second excitation intensity E2 at the second device peak wavelength $\lambda_2$. Especially, E2/E1<1. The luminescent material light 201 may especially have a dominant wavelength selected from the range of 562-582 nm, especially 565-577 nm, such as 567-577 nm.

The third light generating device 110 may comprise a laser light source and may be configured to generate third device light 111 having a third device peak wavelength $\lambda_3$ selected from the wavelength range of 600-650 nm. The third device peak wavelength ($\lambda_3$) may especially be selected from the wavelength range of 610-640 nm.

Especially, $|\lambda_1-\lambda_2|\geq 20$ nm. In embodiments, $\lambda_1$ and $\lambda_2$ are selected from the wavelength range of 420-490 nm. Further, in embodiments $|\lambda_{c,1}-\lambda_3|\geq 30$ nm.

The control system 300 may be configured to control at least the first light generating device 110 and the second light generating device 120.

The light generating system 1000 may be configured to provide in an operational mode white system light 1001.

The luminescent material 200 may comprise a luminescent material of the type $A_3B_5O_{12}$:Ce, A may comprise one or more of Y, La, Gd, Tb and Lu, and B may comprise one or more of Al, Ga, In and Sc. In embodiments, A may comprise at least 50 at. % Lu, and B may comprise at least 90 at. % Al. In embodiments, the luminescent material 200 may comprise 0.5-2 at. % cerium relative to A.

In embodiments, the first light generating device 110 and the second light generating device 120 may be arranged in a single laser bank 500.

Also referring to FIG. 9c, E2/E1≤0.5 or even E2/E1≤0.3.

The luminescent material 200 may be operated in the reflective mode (see FIG. 9b) or in the transmissive mode (see FIG. 9a).

The ceramic body 210 may comprise at least one face thermally coupled to a reflective thermally conductive body 510. The reflective thermally conductive body 510 may be reflective for at least the first device light 111.

The light generating system 1000 may further comprise an optical element 410 configured downstream of the luminescent material 200. The optical element 410 may be reflective for the first device light 111 and transmissive for the luminescent material light 201.

Optical element 420 may e.g. be a beam shaping optics or light mixing optics.

The (beam shaping) optical element may especially comprise a collimator used to convert (to "collimate") a beam of light (to be (further) beam shaped) into a beam having a desired angular distribution. In embodiments, the (beam shaping) optical element may especially comprises a light transmissive body. Hence, the (beam shaping) optical element may be a body of light transmissive material that is configured to collimate the (to be (further) beam shaped). In specific embodiments, the (beam shaping) optical element comprises a compound parabolic like collimator, such as a CPC (compound parabolic concentrator). A massive collimator, such as a massive CPC, may especially be used as extractor of light (to be (further) beam shaped) and to collimate the light (to be (further) beam shaped). Alternatively or additionally, one or more lenses may be used for beam shaping light (to be (further) beam shaped). In this way, the device light may be beam shaped. The optical element may have a beam shaping function. Alternatively or additionally, it may have a homogenization and/or mixing function. Especially, this may be the case when using a collector, such as a CPC.

The control system 300 may be configured to control a spectral power distribution of the system light 1001. The control system 300 may be configured to control the correlated color temperature of the system light 1001 at a value selected from the range of 1800-6500 K. The correlated color temperature of the system light 1001 may be controllable over a CCT control range of at least 500 K within the range of 1800-6500 K. The correlated color temperature of the system light 1001 may be controllable over a CCT control range of at least 1000 K within the range of 2000-6000 K. The control system 300 may be configured to control R9 value of the system light 1001 at a value of at least 30. The R9 value of the system light 1001 may be controllable over a R9 control range of at least 30. The R9 control range at least partly overlaps with the range of at least 30. The color rendering index of the system light 1001 may be at least 80.

Figure 10:
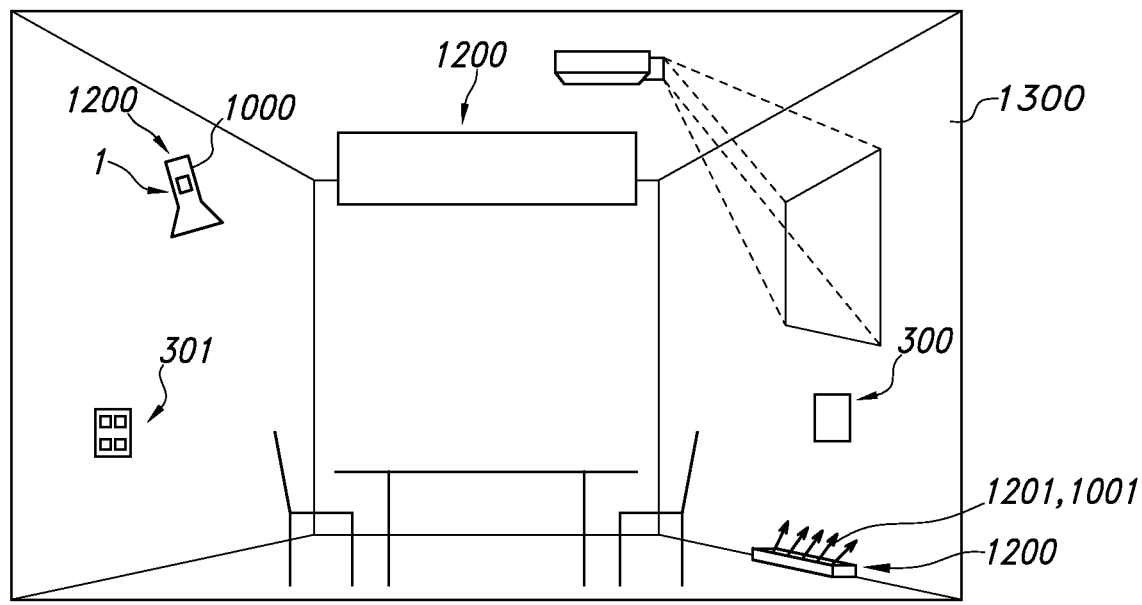
FIG. 10 schematically depict some application embodiments. The schematic drawings are not necessarily to scale.

FIG. 10 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 10 also schematically depicts an embodiment of lamp 1 comprising the light generating system 1000. Reference 3 indicates a projector device or projector system, which may be used to project images, such as at a wall, which may also comprise the light generating system 1000. Hence, FIG. 10 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a first light generating device, a second light generating device, a third light generating device, a luminescent material, and a control system, wherein:
   the first light generating device comprises a first laser light source and is configured to generate first device light having a first device peak wavelength ($\lambda_1$) and having a first spectral power distribution; wherein the first device peak wavelength ($\lambda_1$) is selected from the wavelength range of 445-475 nm;
   the second light generating device comprises a second laser light source and is configured to generate second device light having a second device peak wavelength ($\lambda_2$) and having a second spectral power distribution, different from the first spectral power distribution; wherein the second device peak wavelength ($\lambda_2$) is selected from the range of 470-490 nm;
   the luminescent material is excitable by the first device light and the second device light; wherein the luminescent material is configured to convert at least part of the first device light and the second device light into luminescent material light having a centroid wavelength $\lambda_{c,1}$ within the green-orange wavelength range;
   the luminescent material has an absorbance band having a first absorbance E1 at the first device peak wavelength ($\lambda_1$) and a second absorbance E2 at the second device peak wavelength ($\lambda_2$), wherein E2/E1<1; wherein the luminescent material (200) comprises a luminescent material of the type A3B5O12:Ce, wherein A comprises one or more of Y, La, Gd, Tb and Lu, and wherein B comprises one or more of Al, Ga, In and Sc;
   the third light generating device comprises a third laser light source and is configured to generate third device light having a third device peak wavelength ($\lambda_3$) selected from the wavelength range of 600-650 nm; $|\lambda_1-\lambda_2|\geq 20$ nm; and $|\lambda_{c,1}-\lambda_3|\geq 20$ nm;
   the control system is configured to control at least the first light generating device and the second light generating device;
   the light generating system is configured to provide in an operational mode white system light; and
   wherein the control system is configured to control a spectral power distribution of the system light, wherein the control system is configured to control the correlated color temperature of the system light at a value selected from the range of 1800-6500 K; wherein the correlated color temperature of the system light is controllable over a CCT control range of at least 500 K within the range of 1800-6500 K.

2. The light generating system according to claim 1, wherein the luminescent material comprises a luminescent material of the type $A_3B_5O_{12}$:Ce, wherein A comprises one or more of Y, Gd, and Lu, and wherein B comprises one or more of Al and Ga.

3. The light generating system according to claim 2, wherein A comprises at least 50 at. % Lu, and wherein B comprises at least 90 at. % Al.

4. The light generating system according to claim 2, the luminescent material comprises 0.1-2 at. % cerium relative to A.

5. The light generating system according to claim 1, wherein the first device peak wavelength ($\lambda_1$) is selected from the wavelength range of 450-470 nm.

6. The light generating system according to claim 1, wherein the correlated color temperature of the system light is controllable over a CCT control range of at least 1000 K within the range of 1800-6500 K.

7. The light generating system according to claim 1, wherein the second device peak wavelength ($\lambda_2$) is selected from the range of 470-480 nm.

8. The light generating system according to claim 1, wherein the first light generating device and the second light generating device are arranged in a single laser bank.

9. The light generating system according to claim 1, wherein the luminescent material (200) further comprises a one or more luminescent materials of MS:Eu2+ and/or M2Si5N8:Eu2+ and/or MAlSiN3:Eu2+ and/or Ca2AlSi3O2N5:Eu2+, etc., wherein M comprises one or more of Ba, Sr, and Ca.

10. The light generating system according to claim 1, wherein $0.01 \leq E2/E1 \leq 0.3$.

11. The light generating system according to claim 1, wherein the third device peak wavelength ($\lambda_3$) is selected from the wavelength range of 620-640 nm.

12. The light generating system according to claim 1, wherein the luminescent material light has a dominant wavelength selected from the range of 565-577 nm; where the light generating system comprises a ceramic body, wherein the ceramic body comprises the luminescent material; wherein the luminescent material is operated in the reflective mode; wherein the ceramic body comprises at least one face thermally coupled to a reflective thermally conductive body, wherein the reflective thermally conductive body is reflective for at least the first device light; wherein the light generating system further comprise an optical element configured downstream of the luminescent material, wherein the optical element is reflective for the first device light and transmissive for the luminescent material light.

13. The light generating system according to claim 1, wherein the control system is configured to control a spectral power distribution of the system light, wherein the control system is configured to control the correlated color temperature of the system light at a value selected from the range of 2700-4000 K; wherein the correlated color temperature of the system light is controllable over a CCT control range of at least 500 K within the range of 2700-4000 K.

14. The light generating system according to claim 1, wherein the control system is configured to control R9 value of the system light at a value of at least 30; and wherein the color rendering index of the system light is at least 80.

15. A lighting device selected from the group of a lamp, a luminaire, a projector device, and an optical wireless communication device, comprising the light generating system according to claim 1.

* * * * *